(12) United States Patent
Liu et al.

(10) Patent No.: US 7,754,329 B2
(45) Date of Patent: Jul. 13, 2010

(54) WATER-STABLE SEMICONDUCTOR NANOCRYSTAL COMPLEXES AND METHODS OF MAKING SAME

(75) Inventors: Wei Liu, Schenectady, NY (US); Daniel Landry, Clifton Park, NY (US); Michael LoCascio, Clifton Park, NY (US)

(73) Assignee: Evident Technologies, Inc., Troy, NY (US)

( * ) Notice: Subject to any disclaimer, the term of this patent is extended or adjusted under 35 U.S.C. 154(b) by 449 days.

(21) Appl. No.: 11/683,880

(22) Filed: Mar. 8, 2007

(65) Prior Publication Data
US 2008/0107911 A1    May 8, 2008

Related U.S. Application Data

(60) Provisional application No. 60/856,924, filed on Nov. 6, 2006.

(51) Int. Cl.
*B32B 5/16* (2006.01)
(52) U.S. Cl. ...................... 428/403; 428/407

(58) Field of Classification Search .................. 428/403, 428/407
See application file for complete search history.

(56) References Cited

U.S. PATENT DOCUMENTS

| 6,872,450 | B2* | 3/2005 | Liu et al. ..................... 428/403 |
| 7,147,917 | B2* | 12/2006 | Adams et al. ............... 428/403 |
| 7,335,418 | B2* | 2/2008 | Sato et al. ................... 428/403 |
| 2002/0045045 | A1 | 4/2002 | Adams et al. |
| 2006/0014315 | A1 | 1/2006 | Chan et al. |
| 2006/0019098 | A1 | 1/2006 | Chan et al. |
| 2006/0036084 | A1 | 2/2006 | Qu |
| 2006/0157720 | A1 | 7/2006 | Bawendi et al. |
| 2006/0202167 | A1 | 9/2006 | Landry et al. |

* cited by examiner

*Primary Examiner*—H. (Holly) T Le
(74) *Attorney, Agent, or Firm*—Hoffman Warnick LLC (57) ABSTRACT

A water-stable semiconductor nanocrystal complex and methods of making the same are provided. The water-stable semiconductor nanocrystal complex includes a semiconductor nanocrystal composition, a surfactant layer, and an outer layer. The outer layer and/or the surfactant layer can be cross-linked.

11 Claims, 7 Drawing Sheets

WATER-STABLE SEMICONDUCTOR NANOCRYSTAL COMPLEXES AND METHODS OF MAKING SAME

CROSS-REFERENCE TO RELATED APPLICATIONS

The present application claims priority to U.S. Provisional Application Ser. No. 60/856,924, filed Nov. 6, 2006, which is incorporated by reference herein.

FIELD OF THE INVENTION

The present invention relates generally to water-stable semiconductor nanocrystal complexes and more particularly to surface-modified water-stable semiconductor nanocrystal complexes. In addition, the invention relates to methods of making surface-modified water-stable semiconductor nanocrystal complexes.

BACKGROUND OF THE INVENTION

Semiconductor nanocrystals are typically tiny crystals of II-VI, III-V, IV-VI materials that have a diameter between 1 nanometer (nm) and 20 nm. In the strong confinement limit, the physical diameter of the nanocrystal is smaller than the bulk exciton Bohr radius causing quantum confinement effects to predominate. In this regime, the nanocrystal is a 0-dimensional system that has both quantized density and energy of electronic states where the actual energy and energy differences between electronic states are a function of both the nanocrystal composition and physical size. Larger nanocrystals have more closely spaced energy states and smaller nanocrystals have the reverse. Because interaction of light and matter is determined by the density and energy of electronic states, many of the optical and electric properties of nanocrystals can be tuned or altered simply by changing the nanocrystal geometry (i.e. physical size).

Semiconductor nanocrystals have unique semiconductor properties that range between those of a single molecule and those associated with bulk semiconductor materials. For example, the nature of the discretized energy bands encountered when light impinges on the semiconductor nanocrystal is defined by the energy separation between the valence and conduction bands, known as the bandgap, and can be altered with the addition or the subtraction of a single atom, making for a size-dependent bandgap. As such, following a regime known as quantum confinement, semiconductor nanocrystal complex fluorescence can be observed at size-determined wavelengths, where the size of the semiconductor nanocrystal core fixes the emitted photon at a predetermined wavelength. The density of electron states of a particular complex is quantized relative to the complex's size, such that larger complexes approach bulk-like semiconductor properties and smaller complexes approach single molecule semiconductor properties. The ability to control the electron states of semiconductor nanocrystal complexes and consequently their fluorescence, gives tremendous flexibility to a user, e.g., a biologist, in designing the appropriate materials to fit a given application. Such design freedom is not available when using organic, small molecule fluorophores.

Single nanocrystals or monodisperse populations of nanocrystals exhibit unique optical properties that are size tunable. Both the onset of absorption and the photoluminescent wavelength are a function of nanocrystal size and composition. The nanocrystals will absorb all wavelengths shorter than the absorption onset, however, photoluminescence will always occur at the absorption onset. The bandwidth of the photoluminescent spectra is due to both homogeneous and inhomogeneous broadening mechanisms. Homogeneous mechanisms include temperature dependent Doppler broadening and broadening due to the Heisenburg uncertainty principle, while inhomogeneous broadening is due to the size distribution of the nanocrystals. The narrower the size distribution of the nanocrystals, the narrower the full-width half max (FWHM) of the resultant photoluminescent spectra. In 1991, Brus wrote a paper reviewing the theoretical and experimental research conducted on colloidally grown semiconductor nanocrystals, such as cadmium selenide (CdSe) in particular. Brus L., "Quantum Crystallites and Nonlinear Optics," *Applied Physics A,* 53 (1991)). That research, precipitated in the early 1980's by the likes of Efros, Ekimov, and Brus himself, greatly accelerated by the end of the 1980's as demonstrated by the increase in the number of papers concerning colloidally grown semiconductor nanocrystals.

Quantum yield (i.e. the percent of absorbed photons that are reemitted as photons) is influenced largely by the surface quality of the nanocrystal. Photoexcited charge carriers will emit light upon direct recombination but will give up the excitation energy as heat if photon or defect mediated recombination paths are prevalent. Because the nanocrystal may have a large surface area to volume ratio, dislocations present on the surface or adsorbed surface molecules having a significant potential difference from the nanocrystal itself will tend to trap excited state carriers and prevent radioactive recombination and thus reduce quantum yield. It has been shown that quantum yield can be increased by removing surface defects and separating adsorbed surface molecules from the nanocrystal by adding a shell of a semiconductor with a wider bulk bandgap than that of the core semiconductor.

Inorganic colloids have been studied for over a century ever since Michael Faraday's production of gold sols in 1857. Rossetti and Brus began work on semiconductor colloids in 1982 by preparing and studying the luminescent properties of colloids consisting of II-VI semiconductors, namely cadmium sulfide (CdS). (Rossetti, R.; Brus L., "Electron-Hole Recombination Emission as a Probe of Surface Chemistry in Aqueous CdS Colloids," *J. Phys. Chem.,* 86, 172 (1982)). In that paper, they describe the preparation and resultant optical properties of CdS colloids, where the mean diameter of the suspended particles is greater than 20 nm. Because the sizes of the particles were greater than the exciton Bohr radius, quantum confinement effects that result in the blue shifting of the fluorescence peak was not observed. However, fluorescence at the bulk band edge energies were observed and had a full-width half maximum (FWHM) of 50-60 nm.

CdS colloids exhibiting quantum confinement effects (blue shifted maxima in the absorption spectra) have been prepared since 1984. (Fotjik A., Henglein A., *Ber. Bunsenges. Phys. Chem.,* 88, (1984); Fischer C., Fotjik A., Henglein A., *Ber. Bunsenges. Phys. Chem.,* (1986)). In 1987, Spanhel and Henglein prepared CdS colloids having mean particle diameters between 4 and 6 nm. (Spanhel L., Henglein A., "Photochemistry of Colloidal Semiconductors, Surface Modification and Stability of Strong Luminescing CdS Particles," *Am. Chem. Soc.,* 109 (1987)). The colloids demonstrated quantum confinement effects including the observation of size dependent absorption maxima (first exciton peaks) as well as size dependent fluorescent spectra. The colloids were prepared by bubbling a sulfur containing gas ($H_2S$) through an alkaline solution containing dissolved cadmium ions. The size and resultant color (of the fluorescence) of the resultant nanocrystals were dependent upon the pH of the solution. The colloids were further modified or "activated" by the addition of cadmium hydroxide to the solution that coated the suspended nanocrystals. The resultant core-shell nanocrystals demonstrated that the quantum yield of the photoluminescence increased from under 1% to well over 50% with a FWHM of the photoluminescent spectra under 50 nm for some of the preparations.

Kortan and Brus developed a method for creating CdSe coated zinc sulfide (ZnS) nanocrystals and the opposite, zinc sulfide coated cadmium selenide nanocrystals. (Kortan R., Brus L., "Nucleation and Growth of CdSe on ZnS Quantum Crystallite Seeds, and Vice Versa, in Inverse Micelle Media," *J. Am. Chem. Soc.,* 112 (1990)). The preparation grew ZnS on CdSe "seeds" using a organometallic precursor-based inverse micelle technique and kept them in solution via an organic capping layer (thiol phenol). The CdSe core nanocrystals had diameters between 3.5 and 4 nm and demonstrated quantum confinement effects including observable exciton absorption peaks and blue shifted photoluminescence. Using another preparation, CdSe cores were coated by a 0.4 nm layer of ZnS. The photoluminescence spectra of the resultant core-shell nanocrystals indicates a peak fluorescence at 530 nm with an approximate 40-45 nm FWHM.

Murray and Bawendi developed an organometallic preparation capable of making CdSe, CdS, and CdTe nanocrystals. (Murray C., Norris D., Bawendi M., "Synthesis and Characterization of Nearly Monodisperse CdE (E=S, Se, Te) Semiconductor Nanocrystallites," *J. Am. Chem. Soc.,* 115, (1993)). This work, based on the earlier works of Brus, Henglein, Peyghambarian, allowed for the growth of nanocrystals having a diameter between 1.2 nm and 11.5 nm and with a narrow size distribution (<5%). The synthesis involved a homogeneous nucleation step followed by a growth step. The nucleation step is initiated by the injection of an organometallic cadmium precursor (dimethyl cadmium) with a selenium precursor (TOPSe-Trioctylphosphine selenium) into a heated bath containing coordinating ligands (TOPO-Trioctylphosphine oxide). The precursors disassociate in the solvent, causing the cadmium and selenium to combine to form a growing nanocrystal. The TOPO coordinates with the nanocrystal to moderate and control the growth. The resultant nanocrystal solution showed an approximate 10% size distribution, however, by titrating the solution with methanol the larger nanocrystals could be selectively precipitated from the solution thereby reducing the overall size distribution. After size selective precipitation, the resultant nanocrystals in solution were nearly monodisperse (capable of reaching a 5% size distribution) but were slightly prolate (i.e. nonspherical having an aspect ratio between 1.1 and 1.3). The photoluminescence spectra show a FWHM of approximately 30-35 nm and a quantum yield of approximately 9.6%.

Katari and Alivisatos slightly modified the Murray preparation to make CdSe nanocrystals. (Katari J., Alivisatos A., "X-ray Photoelectron Spectroscopy of CdSe Nanocrystals with Applications to Studies of the Nanocrystal Surface," *J. Phys. Chem.,* 98 (1994)). They found that by substituting the selenium precursor TOPSe with TBPSe (TriButylPhosphine-Selenide), nanocrystals were produced that were nearly monodisperse without size selective precipitation, crystalline, and spherical. The nanocrystals were size tunable from 1.8 nm to 6.7 nm in diameter and had an exciton peak position ranging from 1.9-2.5 eV (corresponding to 635-496 nm wavelength). Like the Murray paper, TOPO was used as the coordinating ligand.

Hines and Guyot-Sionest developed a method for synthesizing a ZnS shell around a CdSe core nanocrystal. (Hines et al., "Synthesis and Characterization of strongly Luminescing ZnS capped CdSe Nanocrystals," *J. Phys. Chem.,* 100:468-471 (1996)). The CdSe cores, having a monodisperse distribution between 2.7 nm and 3.0 nm (i.e. 5% size distribution with average nanocrystal diameter being 2.85 nm), were produced using the Katari and Alivisatos variation of the Murray synthesis. The photoluminescence spectra of the core show a FWHM of approximately 30 nm with a peak at approximately 540 nm. The core CdSe nanocrystals were separated, purified, and resuspended in a TOPO solvent. The solution was heated and injected with zinc and sulfur precursors (dimethyl zinc and $(TMS)_2S$) to form a ZnS shell around the CdSe cores. The resultant shells were 0.6±3 nm thick, corresponding to 1-3 monolayers. The photoluminescence of the core-shell nanocrystals had a peak at 545 nm, FWHM of 40 nm, and a quantum yield of 50%.

Attempts at making quantum dots water soluble have involved coating the quantum dots with a hydrophilic coating. Such attempts, however, have resulted in precipitation of the quantum dots, indicating a lack of tight binding of the hydrophilic coating to the nanocrystal surface. In biological assays that require the quantum dot to couple to a probe molecule, a lack of tight coupling between the probe molecule and the nanocrystal surface will lead to the probe molecule becoming disassociated resulting in inaccurate results of the assay. Attempts at making quantum dots water-soluble and able to stably couple to a probe molecule have also resulted in a marked decrease in the fluorescence quantum yield over time due to oxidation of the nanocrystal. One particular attempt in making quantum dots water soluble involves the use of micelles to solubilize quantum dots and is described in U.S. Pat. No. 6,319,426 to Bawendi. The micelles that are formed using the reagents described in Bawendi, however, are not stable in aqueous solutions.

Other coatings, such as lipids, have been used in the past for coating quantum dots and making them water soluble. In past embodiments amphiphilic lipids interact with the semiconductor nanocrystal core (or shell) through hydrophobic interactions between a lypophillic ligand coating surrounding the nanocrystals and the hydrophobic side of the lipid. Because of the hydrophobic/hydrophobic interaction between the ligands surrounding the nanocrystal and the nanocrystal, the nanocrystal is held in place. However, the nanocrystal is not resistant to variations in the polarity of matrix material in which the nanocrystal may be placed, which could pull the nanocrystal out of place.

One problem associated with water soluble semiconductor nanocrystals is that many coatings do not allow for storage through freezing or lyophillization. This is due in part to the traditional coatings used to make semiconductor nanocrystal complexes water soluble.

Prior art crosslinkable coatings are related to the crosslinking of encapsalents in the hydrophilic surface coating using EDC based chemistry. Crosslinking in the hydrophilic region makes the molecules more difficult to synthesize because the various semiconductor nanocrystals tend to crosslink between themselves and form aggregates.

Thus, there is a need in the art to develop a stable semiconductor nanocrystal complex that is brightly fluorescing and soluble in most common solvents.

SUMMARY OF THE INVENTION

In an embodiment, the present invention provides a water-stable semiconductor nanocrystal complex. The water-stable semiconductor nanocrystal complex comprises a semiconductor nanocrystal composition comprising a semiconductor nanocrystal core. The water-stable semiconductor nanocrystal complex also comprises a surfactant layer comprising molecules having a moiety with an affinity for the semiconductor nanocrystal composition and a moiety with an affinity for a hydrophobic solvent. The water-stable semiconductor nanocrystal complex also comprises an outer layer having a hydrophobic end for interacting with the surfactant layer and a hydrophilic end for interacting with an aqueous medium.

In another embodiment, the present invention provides a method of making a water-stable semiconductor nanocrystal complex. The method comprises synthesizing a semiconductor nanocrystal composition. The method also comprises adding a surfactant layer to the semiconductor nanocrystal composition, the surfactant layer comprising molecules having a moiety with an affinity for the semiconductor nanocrystal composition and a moiety with an affinity for a hydrophobic solvent. The method further comprises adding an outer layer to the surfactant layer, the outer layer having a hydrophobic end for interacting with the surfactant layer and a hydrophilic end for interacting with an aqueous medium.

DETAILED DESCRIPTION OF THE INVENTION

Figure 1:
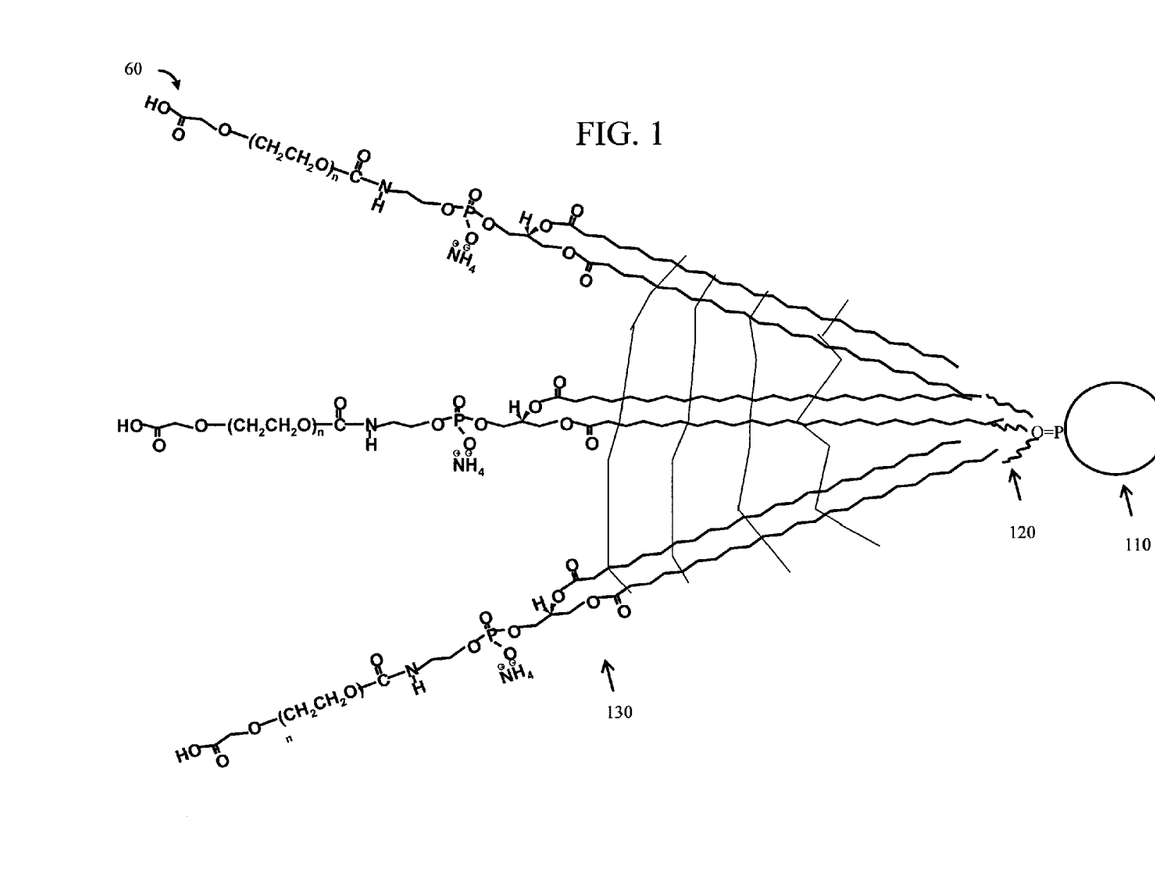
FIG. 1 is a schematic illustration of a semiconductor nanocrystal complex according to an embodiment of the present invention.

The present invention provides semiconductor nanocrystal complexes, particularly water-stable semiconductor nanocrystal complexes. Referring to FIG. 1, in an embodiment, the present invention provides a semiconductor nanocrystal complex 60 comprising a semiconductor nanocrystal composition 110 (also known as a semiconductor nanoparticle or semiconductor quantum dot), a surfactant layer 120, and an outer layer 130. The nanocrystal composition 110, surfactant layer 120, and outer layer 130 contribute to the fluorescence efficacy and/or complex stability and freedom in designing the nanocrystal complex 60 for a given application.

The semiconductor nanocrystal composition 110 comprises a semiconductor nanocrystal core having an outer surface. The semiconductor nanocrystal core may be spherical nanoscale crystalline materials (although oblate and oblique spheroids can be grown as well as rods and other shapes) having a diameter of less than the Bohr radius for a given material and typically but not exclusively comprises II-IV, III-V, and IV-VI binary semiconductors. Non-limiting examples of the semiconductor materials that the semiconductor nanocrystal core may comprise include ZnS, ZnSe, ZnTe, CdS, CdSe, CdTe, HgS, HgSe, HgTe (II-VI materials), PbS, PbSe, PbTe (IV-VI materials), AlN, AlP, AlAs, AlSb, GaN, GaP, GaAs, GaSb, InN, InP, InAs, InSb (III-V materials). In addition to binary semiconductors, the semiconductor nanocrystal core may comprise ternary, quaternary, or quintary semiconductor materials. Non-limiting examples of ternary, quaternary, or quintary semiconductor materials include $A_xB_yC_zD_wE_{2v}$ wherein A and/or B may comprise a group I and/or VII element, and C and D may comprise a group III, II and/or V element although C and D cannot both be group V elements, and E may comprise a VI element, and x, y, z, w, and v are molar fractions between 0 and 1.

In addition to the semiconductor nanocrystal core having an outer surface, the semiconductor nanocrystal composition 110 may comprise a shell formed on the outer surface of the core. The shell is typically, although not always, between 0.1 nm and 10 nm thick. The shell may provide for a type A semiconductor nanocrystal composition 110. Shells may comprise various different semiconductor materials such as, for example, CdSe, CdS, CdTe, ZnS, ZnSe, ZnTe, HgS, HgSe, HgTe, InP, InAs, InSb, InN, GaN, GaP, GaAs, GaSb, PbSe, PbS, and PbTe. The shell may be formed directly on the outer surface of the core or over one or more intermediate layers, such as the metal layer described below, formed on the outer surface of the core.

In an alternate embodiment, the semiconductor nanocrystal composition 110 may comprise the semiconductor nanocrystal core having an outer surface and one or more metal layers formed on the outer surface of the core after synthesis of the core. The metal layer may act to passivate the outer surface of the semiconductor nanocrystal core and limit the diffusion rate of oxygen molecules to the core. The metal layer is typically, although not always, between 0.1 nm and 5 nm thick. The metal layer may include any number, type, combination, and arrangement of metals. For example, the metal layer may be simply a monolayer of metals formed on the outer surface of the core or multiple layers of metals formed on the outer surface. The metal layer may also include different types of metals arranged, for example, in alternating fashion. Further, the metal layer may encapsulate the semiconductor nanocrystal core or may be formed on only parts of the outer surface of the core. The metal layer may include the metal from which the semiconductor nanocrystal core is made either alone or in addition to another metal. Non-limiting examples of metals that may be used as part of the metal layer include Cd, Zn, Hg, Pb, Al, Ga, or In.

The semiconductor nanocrystal core, shell, and/or metal layer may be grown by the pyrolysis of organometallic precursors in a chelating ligand solution or by an exchange reaction using the prerequisite salts in a chelating ligand solution. The chelating ligands are typically lyophilic and have a moiety with an affinity for the outer layer of the semiconductor nanocrystal composition and another moiety with an affinity toward the solvent, which is usually hydrophobic. Typical examples of chelating ligands include lyophilic surfactant molecules such as Trioctylphosphine oxide (TOPO), Trioctylphosphine (TOP), and Tributylphosphine (TBP). The ligands used throughout the nanocrystal synthesis remain on the surface of the nanocrystals after the nanocrystals are removed from the reaction mixture. Thus the ligands used during synthesis comprise the surfactant layer 120. Though the surfactant molecules 120 shown in FIG. 1 include a phosphine moiety, it is to be appreciated that other chelating ligands may be used.

The surfactant layer 120 of the semiconductor nanocrystal complex 60 typically includes organic molecules that have a moiety with an affinity for the surface of the nanocrystal composition 110 and another hydrophobic moiety (such as, for example, an alkane, aromatic and/or other nonpolar or non-ionizable moiety) with an affinity for a hydrophobic solvent. Moieties that have an affinity to the surface of the nanocrystal composition 110 include thiols, amines, phosphines, and phosphine oxides. Surfactants such as TOPO, TOP, and TBP, are typically used in the synthesis of the nanocrystal composition and can remain on the composition's surface after preparation of the composition or may be added or replaced by other surfactants after synthesis. The surfactant layer 120 tends to assemble into a coating around the nanocrystal composition 110 and enables the composition 110 to suspend in a hydrophobic solvent.

The outer layer 130 of the semiconductor nanocrystal complex 60 has one or more hydrophilic end sections and one or more hydrophobic end sections. The outer layer 130 is typically but not exclusively comprised of lipids, amphiphilic diblock polymers, polyampipathic polymers, and/or polypeptides. In the instance where the nanocrystal complex is suspended in water or another hydrophilic solvent, the hydrophobic sections would have an affinity for the hydrophobic moieties of the molecules comprising the surfactant layer 120 and therefore facing inward towards the surfactant coated nanocrystal, while the hydrophilic end sections would be facing outwards towards the water (or other hydrophilic solvent).

In certain embodiments, the hydrophobic end sections of adjacent molecules comprising the outer layer are crosslinked together thereby forming a "net" in which the surfactant coated nanocrystal is held. Crosslinking the molecules comprising the outer layer can prevent them from disassociating from the surfactant coated nanocrystal core thereby increasing the stability (i.e. prevents precipitation and/or aggregation) of the complex in detergents, buffers, salts and other solvents used during conjugation to biological molecules and their subsequent use in biological assays. Crosslinking can further decrease the rate at which oxygen can reach the nanocrystal. Photooxidation is the primary route by which the nanocrystal degrades (resulting in reduced quantum yield), thus crosslinking can increase the stability of the brightness of the semiconductor nanocrystals. Also, by crosslinking in the inward facing hydrophobic sections of the outer layer, the outward facing hydrophilic sections of the outer layer can prevent nanocrystal complexes from aggregating during the crosslinking reaction.

The outer layer 130 may thus eliminate the hydrophobic forces as a means of stabilizing the micelles that surround the semiconductor nanocrystal composition 110. Examples of compounds that may comprise an outer layer include compounds with functional groups that interact with functional groups of adjacent compounds. The hydrophobic sections of outer layer 130 may contain some triple and doubled bonded carbon atoms. Double or triple bonds on adjacent molecules comprising the outer layer may disassociate when illuminated with UV light and then bond together thereby linking the adjacent molecules comprising the outer layer together. Further, an outer layer may comprise amphiphilic diblock polymers with acetelyne or methacylate groups in the hydrophobic region, side branched amphiphilic polymers with crosslinkable acetelyne or methacylate groups on the hydrophobic side, or lipid molecules with acetelyne groups on the hydrophobic side.

In other embodiments, the outer layer 130 may not be crosslinked.

Alternatively or in addition, the present invention provides a semiconductor nanocrystal complex where the hydrophobic moieties of the surfactant layer are cross-linked. For example, referring to FIG. 2, in an embodiment, the present invention provides a semiconductor nanocrystal complex 60 comprising a semiconductor nanocrystal composition 210, a surfactant layer 220, and an outer layer 230. The semiconductor nanocrystal composition 210 and the outer layer 230 may be the same as or similar to those described above, such as reference to FIG. 1.

Figure 2:
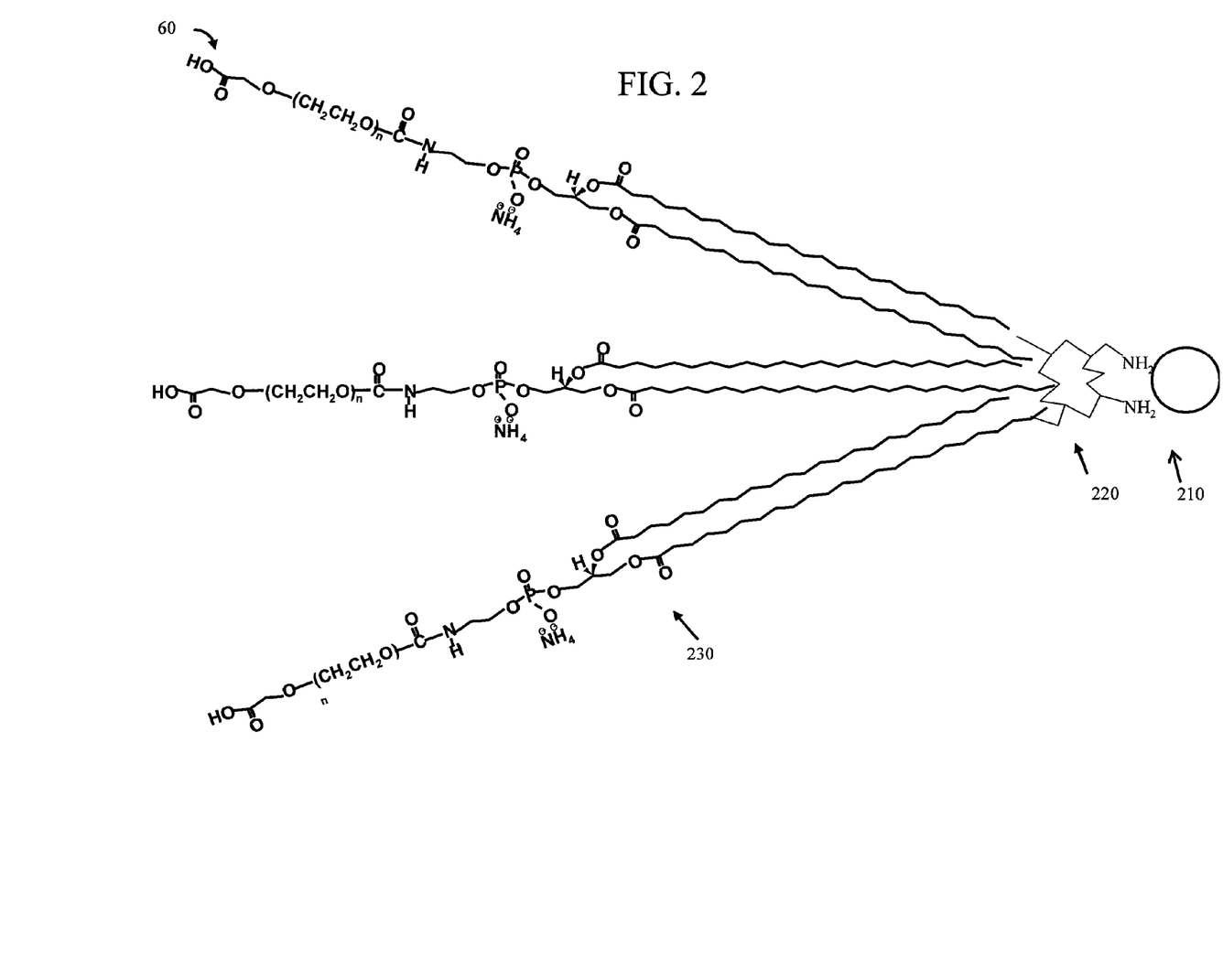
FIG. 2 is a schematic illustration of a semiconductor nanocrystal complex according to another embodiment of the present invention.

The surfactant layer 220 of the semiconductor nanocrystal complex 60 comprises ligand molecules that have metal chelating groups 215 that link to the nanocrystal and one or more hydrophobic (moieties). The hydrophobic moieties, in turn, may contain crosslinkable functional groups and/or crosslinkable double and triple bonds which may be used to link adjacent ligand molecules together. Non-limiting examples of ligands having crosslinkable groups in their hydrophobic portions according to this embodiment of the present invention include but are not limited to acetylene, diacetylene, methacrylate, etc.

Figure 3:
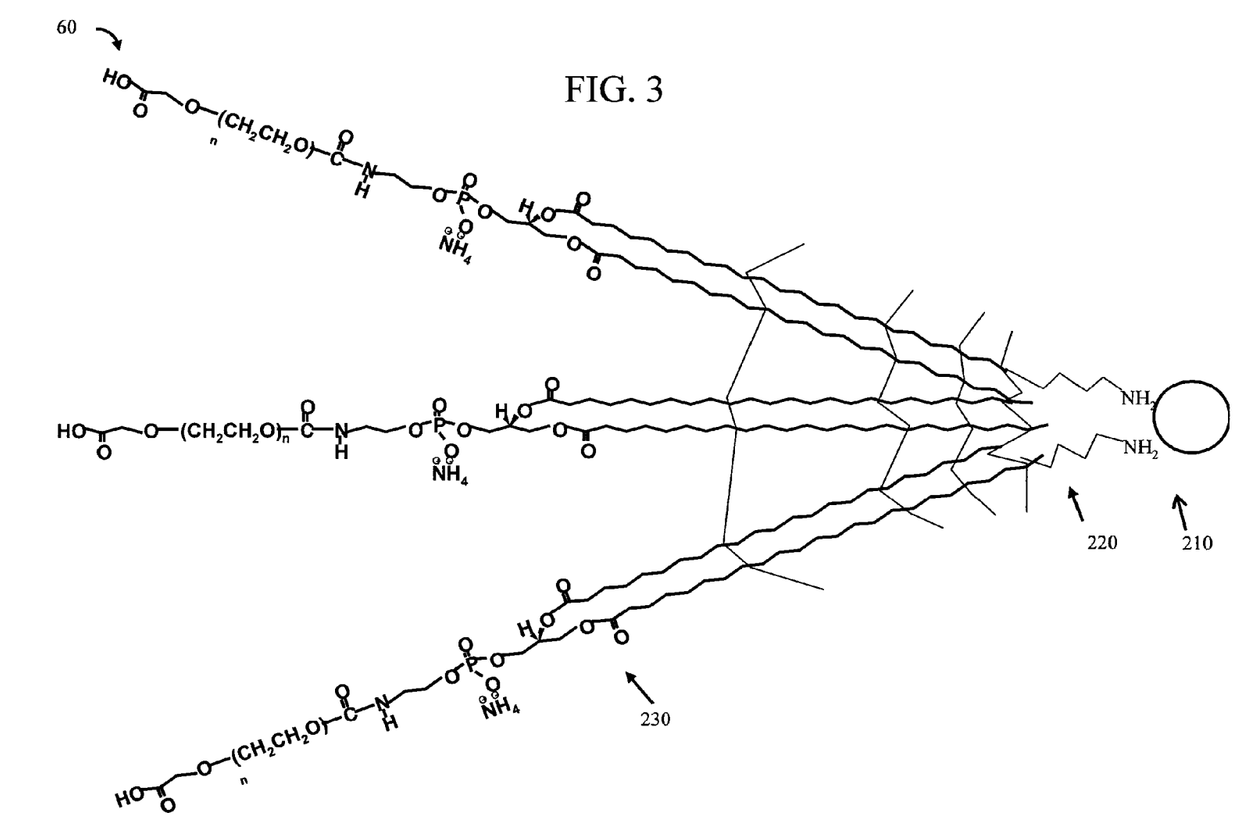
FIG. 3 is a schematic illustration of a semiconductor nanocrystal complex according to another embodiment of the present invention.
Figure 4A:
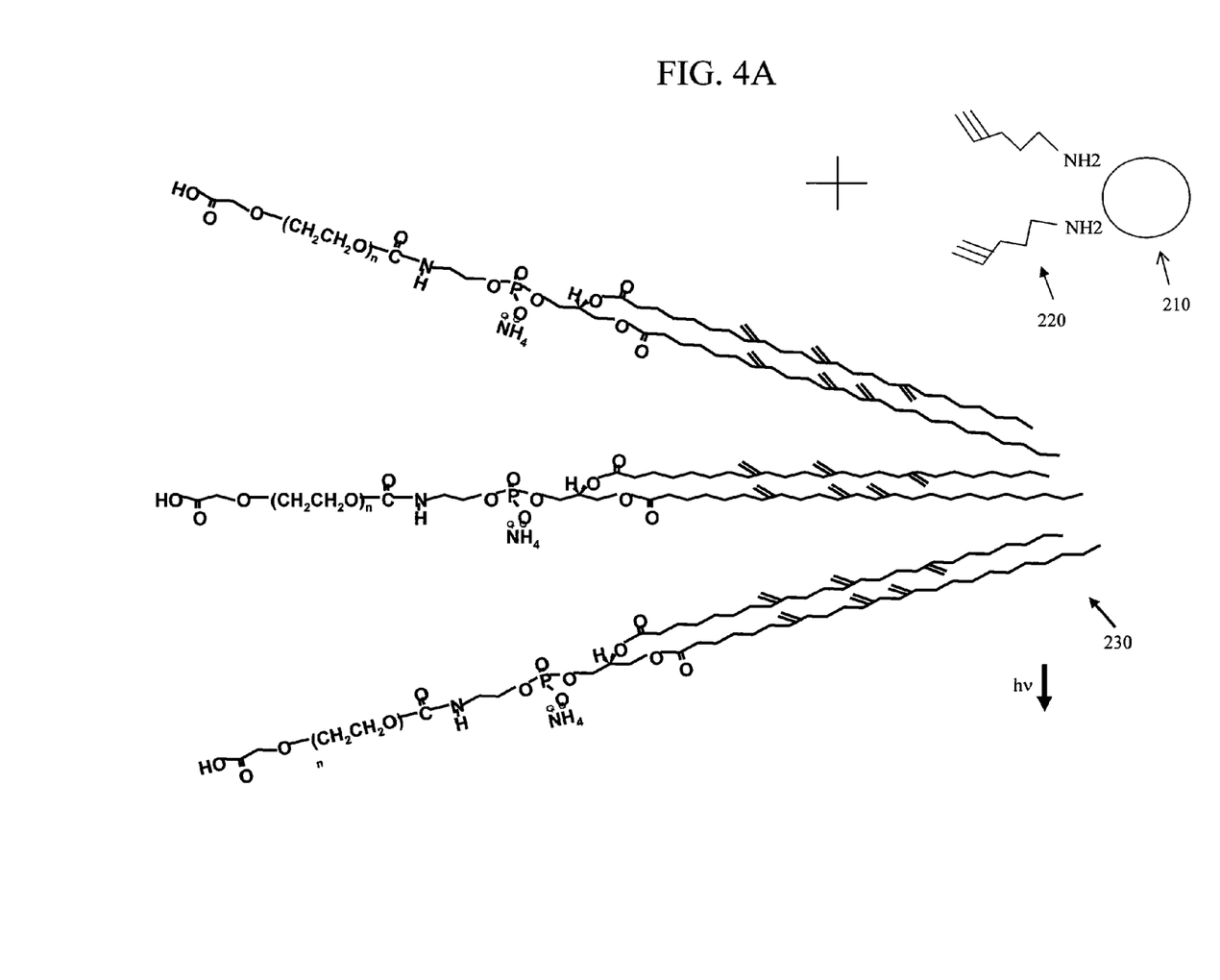
FIGS. 4A and 4B depict a crosslinkable reaction to form a semiconductor nanocrystal complex according to an embodiment of the present invention.
Figure 4B:
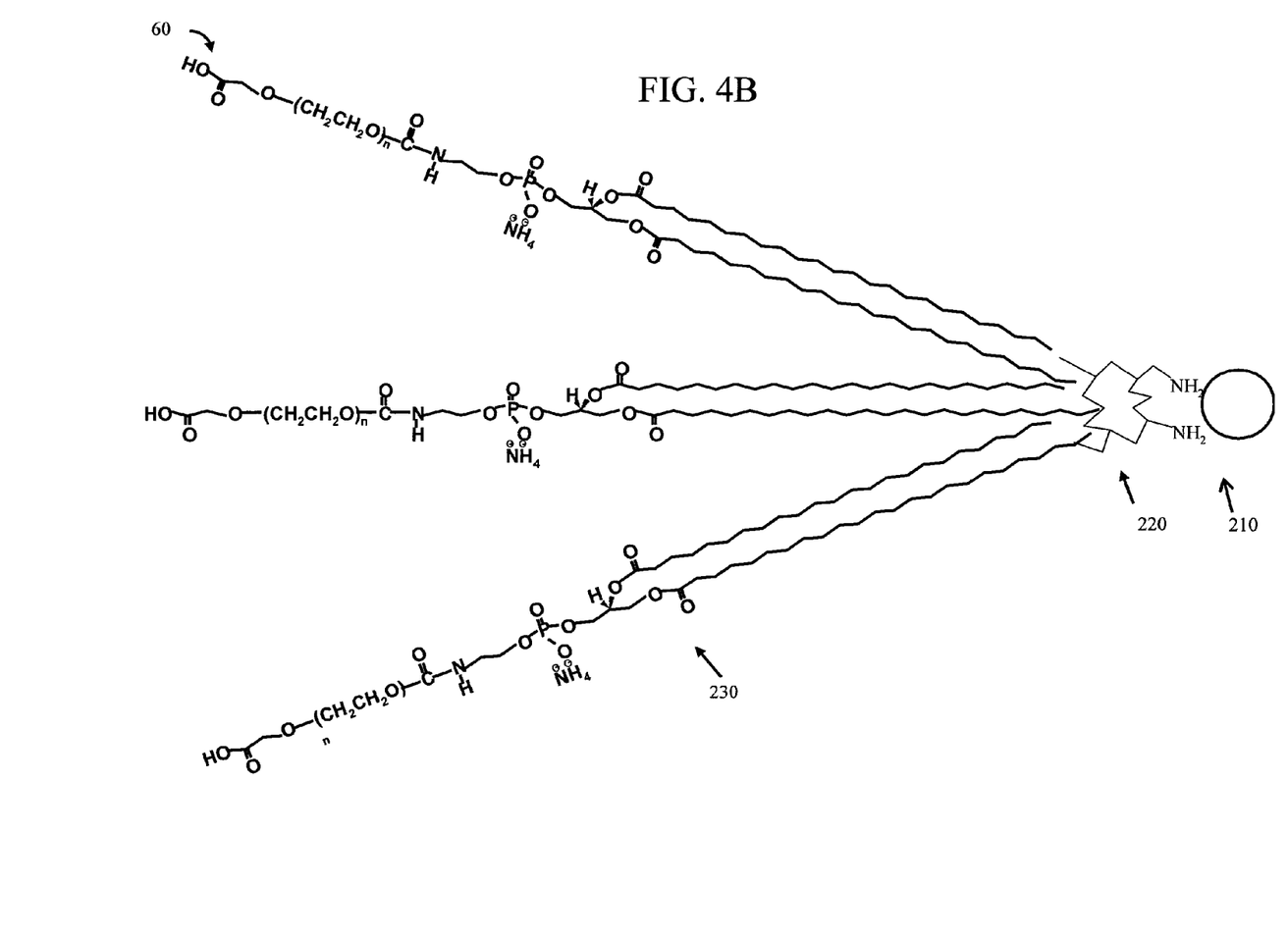

Referring to FIG. 3, alternatively or in addition, the present invention provides a semiconductor nanocrystal complex where the hydrophobic sections of molecules comprising the outer layer are crosslinked with the hydrophobic sections of the molecules comprising the surfactant layer. FIGS. 4A and 4B depict an example of a crosslinking reaction between the surfactant layer 220 and the outer layer 230 to form the semiconductor nanocrystal complex 60 of FIG. 3. The ligands in the surfactant layer 220 can also contain triple bonds which when exposed to light form bonds with the triple bonds of the hydrophobic tails of the amphiphillic coating.

In any of the embodiments of the present invention, the outer layer of a semiconductor nanocrystal complex can provide surface exposed functional groups to facilitate the conjugation of ligands for target specific applications. For example, the semiconductor nanocrystal surfaces can be 'tagged' with a tertiary bio-recognition molecule (such as, for example, an antibody, a peptide, a small molecule drug and/or a nucleic acid) designed to target only the molecular signature of interest (such as, for example, cell surface receptor proteins, viral DNA sequences, and/or disease antigens.) The interaction of the 'tagged' semiconductor nanocrystal with its target could then be visualized with the appropriate fluorescence detection and imaging equipment.

Functional groups exposed on the surface of a water-stable semiconductor nanocrystal complex can be coupled to tertiary molecules such as, for example, nucleic acids, proteins, antibodies, or small molecules and can serve as the basis for many types of in vitro detection assays. Some examples of applicable assays include DNA/RNA assays and microarrays; high throughput screens; whole blood and tissue screening in medical diagnostics; immunoassays; dot blots and other membrane-based detection technologies. Functional groups include but are not limited to alcohol (OH), carboxylate (COOH), and/or amine ($NH_2$). More that one type of functional group may be present on the surface of the outer layer. In addition to comprising functional groups on its surface, the water-stable semiconductor nanocrystal complex may comprise one or more tertiary molecules.

The term tertiary molecule refers to any molecule that can be coupled to the water-stable semiconductor nanocrystal complex. The coupling of tertiary molecules to the water-stable semiconductor nanocrystal complex is achieved by reacting functional groups present on the tertiary molecule with hydrophilic functional groups present on the end of the water-stable semiconductor nanocrystal complex. Tertiary molecules include but are not restricted to an antibody, a protein, a polypeptide, a glycopeptide, a nucleic acid, a peptide nucleic acid, an oligonucleotide, an aptamer, a cellular receptor molecule, a receptor-specific ligand, streptavidin, avidin, biotin, an enzyme, an enzyme cofactor, an oligosaccharide, a lipopolysaccharide, a glycolipid, a lectin, a polymer, a metallic surface, a metallic particle, and suitable combinations thereof. Depending on the material used for the outer layer, the tertiary molecule may be part of the outer layer. For example, in the event that the outer layer comprises a biotin terminated lipid, the tertiary molecule (the biotin) would be a part of the outer layer.

A semiconductor nanocrystal complex of the present invention may be electronically and chemically stable with a high luminescent quantum yield. Chemical stability refers to the ability of a semiconductor nanocrystal complex to have minimal loss of fluorescence over time in aqueous and ambient conditions. Electronic stability refers to whether the addition of electron or hole withdrawing ligands substantially quenches the fluorescence. Preferably, a semiconductor nanocrystal complex would also be colloidally stable in that when suspended in organic or aqueous media (depending on the ligands) they remain soluble over time. A high luminescent quantum yield refers to a quantum yield of at least 10%. Preferably, the quantum yield of the semiconductor nanocrystal complex is at least 25%, more preferably at least 30%, still more preferably at least 45%, even more preferably at least 55%, and even more preferably at least 60% as measured under ambient conditions. The semiconductor nanocrystal complexes of the present invention experience little loss of fluorescence over time and can be manipulated to be soluble in organic and inorganic solvents as traditional semiconductor nanocrystals.

Figure 5:
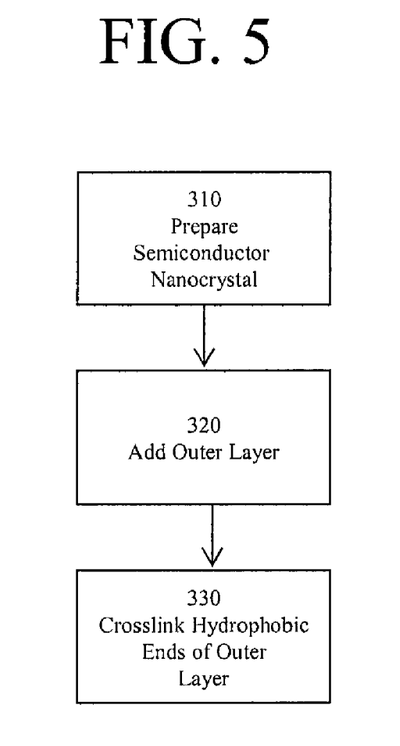
FIG. 5 is a flow chart illustrating a method of making a semiconductor nanocrystal complex according to an embodiment of the present invention.

FIG. 5 provides an exemplary method of making a water-stable semiconductor nanocrystal complex of the present invention. Though the method describes the preparation of a crosslinkable lipid as the outer layer, it is to be appreciated that other types and combinations of outer layers may be used.

In step 310, a semiconductor nanocrystal composition is prepared by synthesizing a semiconductor nanocrystal core having an outer surface. The core can be synthesized by combining the desired semiconductor materials in a surfactant such as TOPO, TOP, or TBP at room temperature and then heating the solution to a temperature at which the synthesis takes place.

A shell may be formed on the outer surface of the core after synthesis of the core. To form the shell, two precursor solutions can be added to the solution of the semiconductor nanocrystal core, where one of the precursor solutions can be a metal precursor in a surfactant. The resulting solution can be heated until the shell forms. Enough of the precursor solutions are added to allow a shell to grow on the surface of the semiconductor nanocrystal core.

Optionally, a metal layer may be formed on the outer surface of the core after synthesis of the core. The metal layer may be formed by adding a metal precursor in a surfactant to the solution of the semiconductor nanocrystal core and heating the solution until the metal layer forms.

An alternative to shelling the semiconductor nanocrystal core that can result in an outer coating of a desired semiconductor material is through the addition of a chalcagonide, pnictide or a non-metal anion layer. The anion layer may be a layer of one or more anionic elements and does not include metallic compounds. The anion layer may include any number, type, combination, and arrangement of anions. For example, the anion layer may be simply a monolayer of anions added to the metal layer. Non-limiting examples of elements that may comprise the anion layer include group IV, V, and VI elements.

The semiconductor nanocrystal composition is prepared at atmospheric pressure.

The surfactants used to prepare the composition remain as organic molecules on the surface of the nanocrystal composition after synthesis of the composition and may form a surfactant layer on the composition. If different surface molecules are desired, an exchange reaction may take place to exchange the surfactant on the surface with a different desired surfactant. Such exchange reactions are known in the art.

In step 320, an outer layer is added to make the semiconductor nanocrystal complex water-stable. The outer layer may include lipids having a hydrophilic end section and a hydrophobic end section. Typically, the outer layer is added at room temperature and the resulting solution is heated.

In step 330, the outer layer is crosslinked at its hydrophobic ends. For example, lipids used as the outer layer may be crosslinked upon initiation of ultraviolet (UV) irradiation, such as, 254 nm UV radiation. There are a number of methods used to initiate crosslinking (i.e. polymerization) which are, of course, dependent on the functional groups intended to be crosslinked. For example, chemical initiators may be used that are either thermally activated or UV activated. Examples include peroxides and AIBN (which crosslinks vinyl groups) etc. Adjacent molecules may be crosslinked together by bridging molecules. For example, if the hydrophobic regions on adjacent molecules forming the outer layer contained some amine groups, they could be crosslinked together by the addition of small molecules with 2 or more carboxyl groups that react with the amines and serve to link together adjacent molecules. The above-described technique is only exemplary and other modifications may be made that result in semiconductor nanocrystal complexes according to the present invention.

Figure 6:
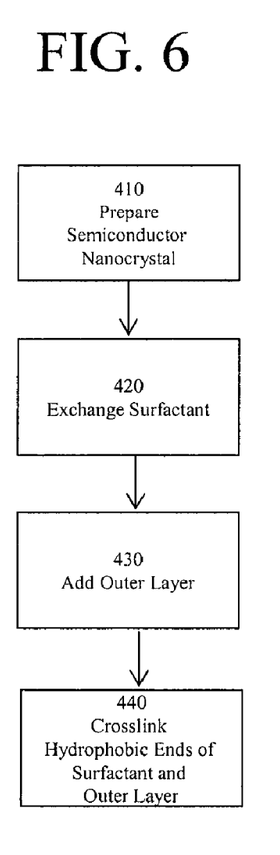
FIG. 6 is a flow chart illustrating a method of making a semiconductor nanocrystal complex according to another embodiment of the present invention.

FIG. 6 provides another method of making a water-stable semiconductor nanocrystal complex of the present invention. Though the method describes the preparation of a crosslinkable surfactant and a crosslinkable outer layer, it is to be appreciated that other types and combinations of surfactants and outer layers may be used.

In step 410, a semiconductor nanocrystal composition is prepared as described above in step 310 of FIG. 5.

In step 420, the surfactant in which the semiconductor nanocrystal composition was prepared is exchanged for a surfactant that is able to crosslink. Typical examples of chelating ligands in which a semiconductor nanocrystal composition is prepared include lyophilic surfactant molecules such as TOPO, TOP, and TBP. These surfactants may be exchanged for surfactants that have crosslinkable moieties using ligand exchange processes, for example. Generally, a solvent in which the surfacts ligands are soluble in is added to the nanocrystal dispersion followed by precipitation (often facilitated by centrifugation). After precipitation the supernatant is removed and more solvent is added along with the new ligand molecules that are meant to replace the original. The nanocrystal precipitate/solvent/new ligand is subjected to sonication and/or heat which facilitates the envelopment of the nanocrystals with the new ligand. These steps may be repeated to ensure complete removal of the original ligand and replacement with the new ligand. Examples of crosslinkable moieties include acetylene, diacetylene, and methacrylates. The crosslinkable surfactants may have first ends with an affinity for the semiconductor nanocrystal composition and second ends that are crosslinkable, where the second ends have hydrophobic sections. The crosslinkable surfactants form the surfactant layer on the semiconductor nanocrystal composition.

In step 430, an outer layer is added to make the semiconductor nanocrystal complex water-stable and the resulting solution is heated.

In step 440, the surfactant layer and the outer layer are crosslinked together. In addition to the hydrophobic portion of the outer layer having crosslinkable groups, the ligand (surfactant layer) may also contain double or triple bonds which when exposed to UV light (or other methods of crosslinking described above) forms bonds with the double and triple bonds present in second hydrophobic section of the molecules comprising the outer layer (i.e. the fatty acid tails of the lipid molecules)] For example, the hydrophobic ends of the surfactant layer may be crosslinked with the hydrophobic ends of the encapsulation layer. The hydrophobic ends of the outer layer may also be crosslinked together.

The above-described technique is only exemplary and other modifications may be made that result in semiconductor nanocrystal compositions according to the present invention.

EXAMPLES

Preparing Water-Stable Semiconductor Nanocrystal Complex

Solution 1. 2 m (1 mg/ml) CdSe/ZnS core-shell nanocrystals in toluene solution are loaded into a 15 ml centrifuge tube and 10 ml methanol is added. These nanocrystals may have an emission wavelength of ~560 nm. The solution is mixed and centrifuged at 400 rpm for 3 minutes. The supernatant is carefully removed and 4 ml of hexane is added to re-dissolve the pellet of the nanocrystals. Then 8 ml methanol is added in the centrifuge tube to precipitate down the nanocrystals again. This step is repeated with hexane and methanol one more times and the resulting precipitate is dried and then re-dissolved in 1 ml chloroform.

Solution 2. 10 mg 1,2-bis(10,12-tricosadiynoyl)-sn-glycero-3-phosphoethanolamine-N-(carboxy(polyethylenegly-col)2000) (ammonium salt) lipids are dissolved in 3 ml chloroform solution.

Solutions 1 and 2 are mixed in a 20 ml vial and dried under nitrogen. Then the vial is slowly spun so that the solution makes a thin film on the vial wall as the solution is drying. The vial is then heated to 70° C. in a water bath for 2 minutes. To the heated vial, 5 ml deionized water, which has been pre-heated to 70° C., is added. Then the vial is capped, and the solution is vortexed until all the nanocrystals are dissolved. The solution is sonicated for 1 minute.

The solution is transferred into a 15 ml centrifuge tube and spun at 400 rpm for 5 minutes. The clear supernatant is loaded into a 10 ml syringe and filtrated through a 0.2 μm filter. Then the filtrated solution is transferred into a quartz photocell, purged with nitrogen or argon, and capped. The crosslinking reaction is initiated by irradiating the solution with a 256 nm UV light. Afterwards, the filtrated solution is loaded into two 11 ml ultracentrifuge tubes and centrifuged at 65000 rpm for 1 hour. The supernatant is carefully removed. The precipitate is re-dissolved in deionized water. The ultracentrifuge purification step is repeated one more time. The precipitate is re-dissolved in 4 ml deionized water and the solution stored at 4° C.

The foregoing description and example have been set forth merely to illustrate the invention and are not intended as being limiting. Each of the disclosed aspects and embodiments of the present invention may be considered individually or in combination with other aspects, embodiments, and variations of the invention. For example, any or all of the embodiments such as (a) embodiments where the hydrophobic sections of adjacent molecules comprising the outer layer are cross linked together; (b) embodiments where the hydrophobic sections of adjacent molecules comprising the surfactant layer are linked together and (c) embodiments where the hydrophobic sections of molecules comprising the outer layer are cross-linked with hydrophobic sections of the molecules comprising the surfactant layer can be combined with each other. Further, to the extent advantages are described for certain embodiments, such advantages should not be read into as limitations of the below claims. In addition, unless otherwise specified, none of the steps of the methods of the present invention are confined to any particular order of performance. Modifications of the disclosed embodiments incorporating the spirit and substance of the invention may occur to persons skilled in the art and such modifications are within the scope of the present invention. Furthermore, all references cited herein are incorporated by reference in their entirety.

We claim:

1. A water-stable semiconductor nanocrystal complex comprising:
   a semiconductor nanocrystal composition comprising a semiconductor nanocrystal core;
   a surfactant layer comprising molecules, each molecule having a moiety with an affinity for the semiconductor nanocrystal composition and a hydrophobic moiety with an affinity for a hydrophobic solvent; and
   an outer layer having hydrophobic sections for interacting with the surfactant layer and hydrophilic sections for interacting with an aqueous medium, wherein the semiconductor nanocrystal complex is chemically and electrically stable with a luminescent quantum yield of at least 10%, and wherein at least one of the hydrophobic moieties of the surfactant layer is cross-linked with at least one of the hydrophobic sections of the outer layer.

2. The water-stable semiconductor nanocrystal complex of claim 1, wherein the semiconductor nanocrystal core has an outer surface and the semiconductor nanocrystal composition further comprises a shell comprising a semiconductor material, the shell formed on the outer surface of the semiconductor nanocrystal core.

3. The water-stable semiconductor nanocrystal complex of claim 1, wherein the semiconductor nanocrystal core has an outer surface and the semiconductor nanocrystal composition further comprises:
   a metal layer, the metal layer formed on the outer surface of the semiconductor nanocrystal core after synthesis of the semiconductor nanocrystal core, and a shell comprising a semiconductor material, the shell overcoating the metal layer.

4. The water-stable semiconductor nanocrystal complex of claim 1, wherein the surfactant layer comprises thiols, amines, phosphines, phosphine oxides, or any suitable combination thereof.

5. The water-stable semiconductor nanocrystal complex of claim 1, wherein at least two adjacent hydrophobic moieties of the surfactant layer are cross-linked.

6. The water-stable semiconductor nanocrystal complex of claim 1, wherein the outer layer comprises an amphiphilic diblock polymer, a side-branched amphiphilic polymer, a lipid molecule, or any suitable combination thereof.

7. The water-stable semiconductor nanocrystal complex of claim 1, wherein at least two adjacent hydrophobic sections of the outer layer are cross-linked.

8. The water-stable semiconductor nanocrystal complex of claim 1, wherein at least one of the hydrophobic sections of the outer layer comprises functional groups for coupling to one or more tertiary molecules.

9. The water-stable semiconductor nanocrystal complex of claim 8, wherein the tertiary molecule is a biomolecule.

10. The water-stable semiconductor nanocrystal complex of claim 9, wherein the tertiary molecule is selected from the group consisting of an antibody, a protein, a polypeptide, a glycopeptide, a nucleic acid, a peptide nucleic acid, an oligonucleotide, an aptamer, a cellular receptor molecule, a receptor-specific ligand, streptaviddin, avidin, biotin, an enzyme, an enzyme cofactor, an oligosaccharide, a lipopolysaccharide, a glycolipid, a lection, a polymer, a metallic surface, a metallic particle.

11. The water-stable semiconductor nanocrystal complex of claim 1, wherein the luminescent quantum yield is at least 25%.

* * * * *